United States Patent
Izawa et al.

(10) Patent No.: US 10,714,282 B2
(45) Date of Patent: Jul. 14, 2020

(54) KEYBOARD SWITCH LINK MEMBER CONFIGURATION

(71) Applicant: OMRON Corporation, Kyoto (JP)

(72) Inventors: Kazuhira Izawa, Okayama (JP); Hiroaki Fujino, Okayama (JP); Mamiko Naka, Okayama (JP); Kenshi Nagata, Tottori (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/193,720

(22) Filed: Nov. 16, 2018

(65) Prior Publication Data

US 2019/0088427 A1 Mar. 21, 2019

Related U.S. Application Data

(63) Continuation of application No. PCT/JP2017/010460, filed on Mar. 15, 2017.

(30) Foreign Application Priority Data

Jun. 2, 2016 (JP) .................................. 2016-111339

(51) Int. Cl.
*H01H 13/7065* (2006.01)
*H01H 13/80* (2006.01)
(Continued)

(52) U.S. Cl.
CPC .............. *H01H 13/80* (2013.01); *G06F 3/02* (2013.01); *G06F 3/0202* (2013.01);
(Continued)

(58) Field of Classification Search
CPC .. H01H 13/125; H01H 13/14; H01H 13/7065; H01H 13/88; H01H 2221/058; G06F 3/0202
See application file for complete search history.

(56) References Cited

U.S. PATENT DOCUMENTS

| 5,657,860 A * | 8/1997 | Koike | ................... H01H 3/125 200/344 |
| 8,759,705 B2 * | 6/2014 | Funakoshi | ............. H01H 3/125 200/344 |

(Continued)

FOREIGN PATENT DOCUMENTS

| CN | 1716483 A | 1/2006 |
| CN | 105321754 A | 2/2016 |

(Continued)

OTHER PUBLICATIONS

Office Action issued in Chinese Application No. 201780028542.1, dated Apr. 29, 2019 (17 pages).

(Continued)

*Primary Examiner* — Vanessa Girardi
(74) *Attorney, Agent, or Firm* — Osha Liang LLP

(57) ABSTRACT

A switch has a base, an operation unit disposed above the base and moving in a contacting-separating direction with respect to the base in response to an external force, a pair of link members configured to guide movement of the operation unit in the contacting-separating direction, and a coupling portion configured to turnably couple the pair of link members to each other. Each of the pair of link members each includes a coupling-portion-side supported portion supported on one of the base and the operation unit and an end-side supported portion supported on the other of the base and the operation unit. One of the base and the operation unit on which the coupling-portion-side supported portion is supported includes a wall surface provided with a movement space.

12 Claims, 10 Drawing Sheets

(51) Int. Cl.
*H01H 13/14* (2006.01)
*H01H 11/00* (2006.01)
*G06F 3/02* (2006.01)
*H01H 13/79* (2006.01)
*H01H 13/88* (2006.01)

(52) U.S. Cl.
CPC ............ *H01H 11/00* (2013.01); *H01H 13/14* (2013.01); *H01H 13/7065* (2013.01); *H01H 13/79* (2013.01); *H01H 13/88* (2013.01); *H01H 2221/052* (2013.01); *H01H 2221/058* (2013.01)

(56) References Cited

U.S. PATENT DOCUMENTS

| | | |
|---|---|---|
| 2006/0000694 A1 | 1/2006 | Nishino et al. |
| 2008/0006516 A1 | 1/2008 | Nishino et al. |
| 2008/0035461 A1 | 2/2008 | Nishino |

FOREIGN PATENT DOCUMENTS

| | | |
|---|---|---|
| JP | 2008-21423 A | 1/2008 |
| JP | 2008-47351 A | 2/2008 |
| JP | 2009-54594 A | 3/2009 |

OTHER PUBLICATIONS

International Search Report issued in Application No. PCT/JP2017/010460, dated Jun. 20, 2017 (1 page).
Written Opinion issued in International Application No. PCT/JP2017/010460, dated Jun. 20, 2017 (5 pages).

\* cited by examiner up and down in parallel even when a corner part of the operation unit is pressed while achieving a low profile, for example, a key switch device disclosed in Patent Document 1 using a link member is hitherto known.
KEYBOARD SWITCH LINK MEMBER CONFIGURATION

BACKGROUND

Technical Field

The present invention relates to a switch, a keyboard, and a switch production method, the switch including a pair of link members that smoothly move an operation unit in parallel in a contacting/separating direction even when a corner part of the operation unit is pressed.

Related Art

As a mechanism for smoothly moving an operation unit up and down in parallel even when a corner part of the operation unit is pressed while achieving a low profile, for example, a key switch device disclosed in Patent Document 1 using a link member is hitherto known.

As illustrated in FIG. 11(a), the key switch device 100 disclosed in Patent Document 1 includes: a base 110; a key top 140 disposed on the base 110; a pair of link members 130 that interlock to guide and support the key top 140 on the base 110 in an upward/downward direction; and a switch mechanism 120 that opens and closes contacts 121 of an electric circuit in response to upward/downward operation of the key top 140.

At the time of assembling the key switch device 100, as illustrated in FIG. 11(b), a membrane sheet switch 122 is placed on the base 110. Next, while a sliding spindle 131 of the link member 130 is inserted into a guide hole 112 in an upright plate portion 111, a gear recessed portion 132 and a gear projecting portion 133 of the link member 130 are latched to each other and placed flat on the base 110. Then, four bearings (not illustrated) of the key top 140 are individually fitted to a total of four rotary spindles 10 in the respective link members 130 from above the pair of link members 130.

Patent Document

Patent Document 1: Japanese Unexamined Patent Publication No. 2008-47351 (published on Feb. 28, 2008)

SUMMARY OF THE INVENTION

In the conventional key switch device 100, the link member 130 is fixed to the base 110 side by a snap fit using the elasticity of the link member 130, in which the sliding spindle 131 of the link member 130 is inserted into the guide hole 112 in the upright plate portion 111.

However, at the time of inserting the sliding spindle 131 into the guide hole 112, the guide hole 112 or the sliding spindle 131 might be deformed to hinder smooth operation.

One or more embodiments of the present invention provide a switch, a keyboard, and a switch production method, capable of maintaining smooth operation by performing assembly so as to be able to support a link member without using a snap fit.

A switch of one aspect of the present invention includes: a base; an operation unit disposed above the base and moving in a contacting/separating direction with respect to the base in response to an external force; a pair of link members configured to guide movement of the operation unit in the contacting/separating direction; and a coupling portion configured to turnably couple the pair of link members to each other, the pair of link members each including a coupling-portion-side supported portion supported on one of the base and the operation unit and an end-side supported portion supported on the other of the base and the operation unit. One of the base and the operation unit on which the coupling-portion-side supported portion is supported includes a wall surface provided with a movement space through which the pair of link members, turned around the coupling portion to be folded, is allowed to pass while movement is regulated by neither the base nor the operation unit.

A keyboard of one aspect of the present invention includes a plurality of the switches described above.

A switch production method of one aspect of the present invention is a production method for a switch including a base, an operation unit disposed above the base and moving in a contacting/separating direction with respect to the base in response to an external force, a pair of link members configured to guide movement of the operation unit in the contacting/separating direction, and a coupling portion configured to turnably couple the pair of link members to each other, the pair of link members each including a coupling-portion-side supported portion supported on one of the base and the operation unit and an end-side supported portion supported on the other of the base and the operation unit, one of the base and the operation unit, on which the coupling-portion-side supported portion is supported, including a wall surface provided with a movement space through which the pair of link members, turned around the coupling portion to be folded, is allowed to pass while movement is regulated by neither the base nor the operation unit, the method including: turning the pair of link members around the coupling portion to be folded and allowing the coupling-portion-side supported portion to pass through the movement space on the wall surface; turning the pair of link members around the coupling portion to be spread and disposing the coupling-portion-side supported portion between the wall surface and the base or the operation unit; and performing assembly so as to be able to support the end-side supported portion on the operation unit or the base.

According to the switch of one aspect of the present invention, the pair of link members couples the base and the operation unit to each other. In addition, the coupling portion turnably couples the pair of link members to each other. With these configurations, it is possible to form a structure in which, when the operation unit moves in the contacting/separating direction with respect to the base, whichever part of the operation unit is pressed, the operation unit can be held in the state of being oriented in a certain direction with respect to the base, such as being in parallel to the base. That is, it is possible to provide a switch capable of maintaining smooth operation by assembling the switch so as to be able to support the link member without using a snap fit.

According to the keyboard of one aspect of the present invention, it is possible to provide a keyboard including the switch capable of maintaining smooth operation.

According to the production method of one aspect of the present invention, it is possible to perform assembly so as to be able to support the link member without using the snap fit, and to provide a production method for a switch capable of maintaining smooth operation.

DETAILED DESCRIPTION

Embodiments of the present invention will be described as follows with reference to FIGS. 1(a) to 10(c). In the following description, terms indicating specific directions or positions (e.g., terms including "upper", "lower", "right", and "left") are used as necessary. However, these terms are used to facilitate understanding of the invention with reference to the drawings, and the meanings of the terms do not limit the technical scope of the present invention. The following description is merely exemplary in nature and not intended to limit the present invention, its application, or its usage. Further, the drawings are schematic, and ratios of dimensions or the like do not necessarily agree with actual ones.

A switch according to the embodiment includes a pair of link members that smoothly moves an operation unit up and down (in a direction in which the operation unit comes into contact with or separates from the base) in parallel even when a corner part of the operation unit is pressed. The switch is suitably used in a keyboard of a personal computer or the like, for example, by detachably attaching a key top onto the operation unit. In some cases, the operation unit is used as it is as a key top. In each of sectional views illustrated in FIGS. 1(a), 1(b), 4, 5, 7(b), 8(b), 9(b), 10(b), and 10(c), a resin hatching portion means resin insulating hatching. Light black given to a first link member 21 and a second link member 22 is for making the first link member 21 and the second link member 22 easier to understand, and is not hatching.

(Configuration of Switch)

Figure 2A:
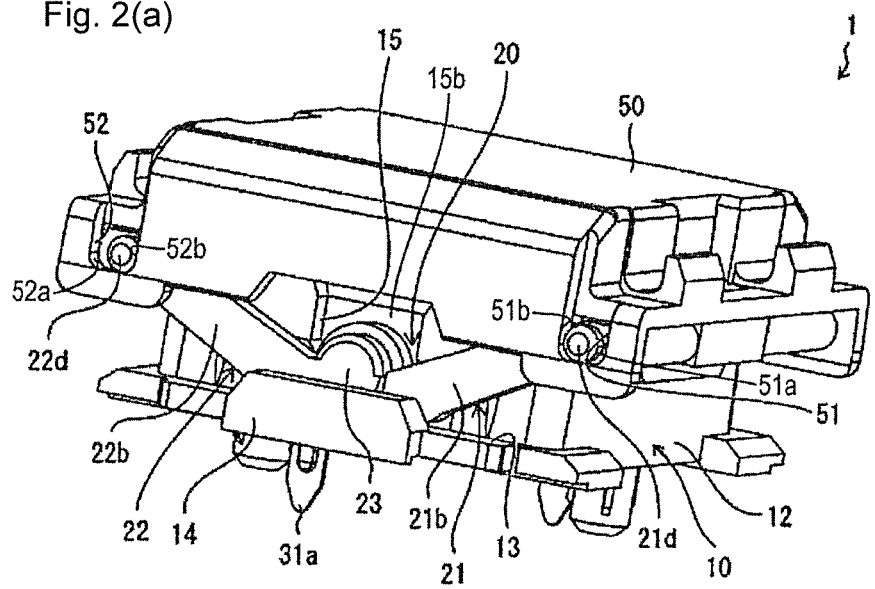
FIG. 2(a) is a perspective view illustrating a state of the switch when the operation unit is not depressed.
Figure 2B:
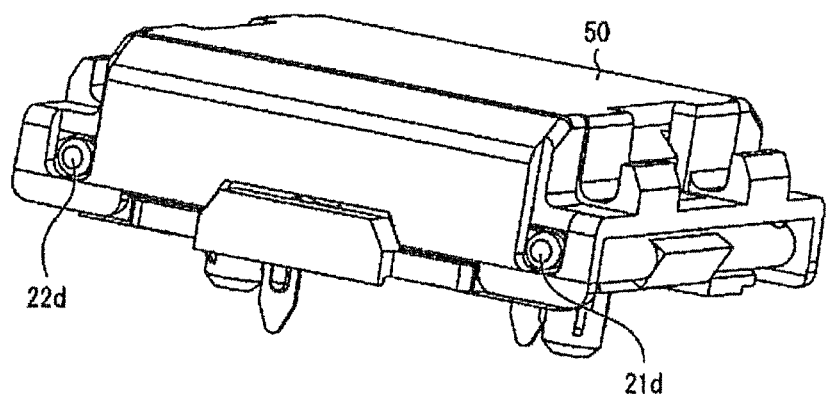
FIG. 2(b) is a perspective view illustrating a state of the switch when the operation unit is depressed.
Figure 3:
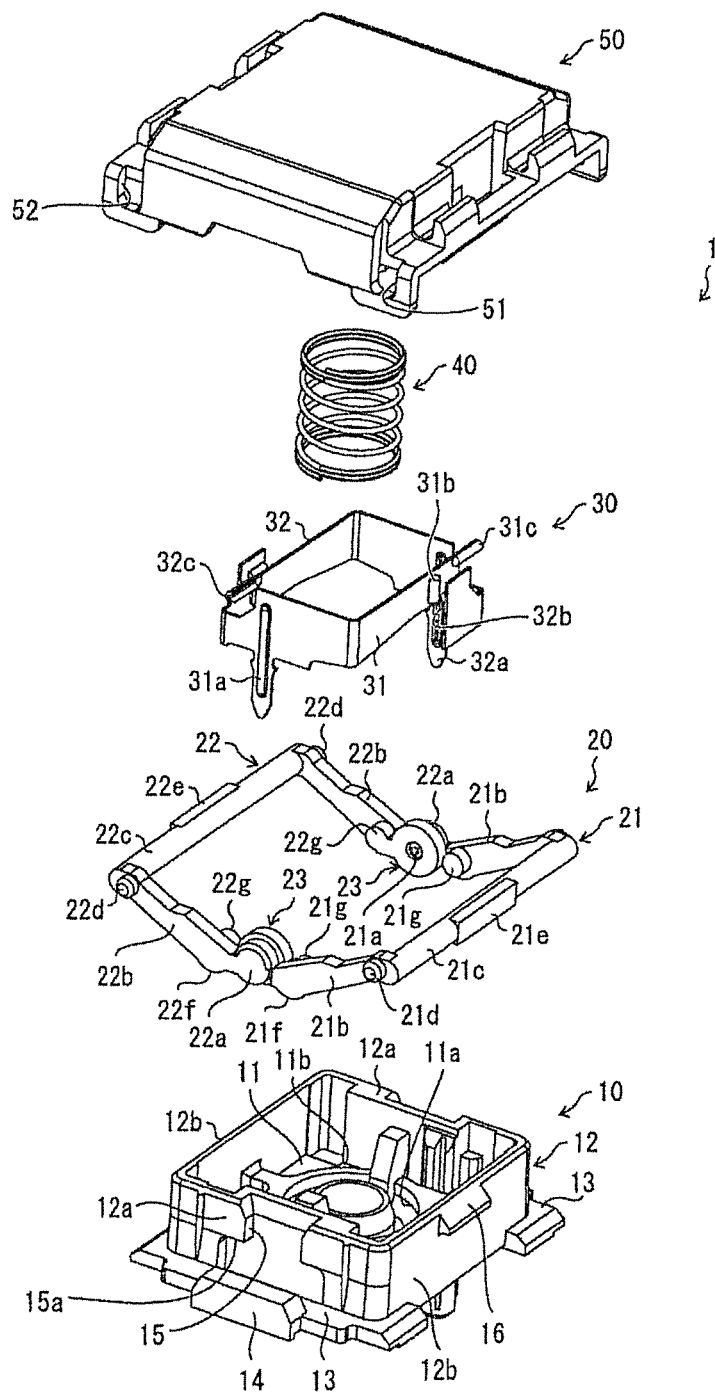
FIG. 3 is an exploded perspective view illustrating a configuration of the switch.

The configuration of the switch of the embodiment will be described with reference to FIGS. 2(a), 2(b), and FIG. 3. FIG. 2(a) is a perspective view illustrating the configuration in a state where an operation unit 50 in the switch of the embodiment has not been depressed, and FIG. 2(b) is a perspective view illustrating the configuration in a state where the operation unit 50 in the switch 1 has been pressed. FIG. 3 is an exploded perspective view illustrating the configuration of the switch of the embodiment.

As illustrated in FIGS. 2(a) and 2(b), the switch 1 of the embodiment includes a base 10 and an operation unit 50 as an operation unit disposed above the base 10. As illustrated in FIG. 3, between the base 10 and the operation unit 50, there are provided a pair of link members 20 that interlock with each other to guide and support the operation unit 50 on the base 10 in an upward/downward (contacting/separating) direction, a switch mechanism 30 that opens and closes contacts of an electric circuit in response to upward/downward operation (contacting/separating operation) of the operation unit 50, and a coil spring 40.

The base 10 is made up of a square frame 12 having a bottom 11, and a guard portion 13 is formed outside a pair of one opposed side walls 12a in the square frame 12. This guard portion 13 is used to support the link member 20. Further, in the embodiment, the outer surface of a guard portion 13 in a direction of a turning shaft of a link member 22 is provided with an extrusion preventing wall 14 as a deformation preventing portion for preventing extrusion of the elastic link member 20 from the square frame 12 of the base 10 in the direction of the turning shaft of the link member 22.

Figure 6:
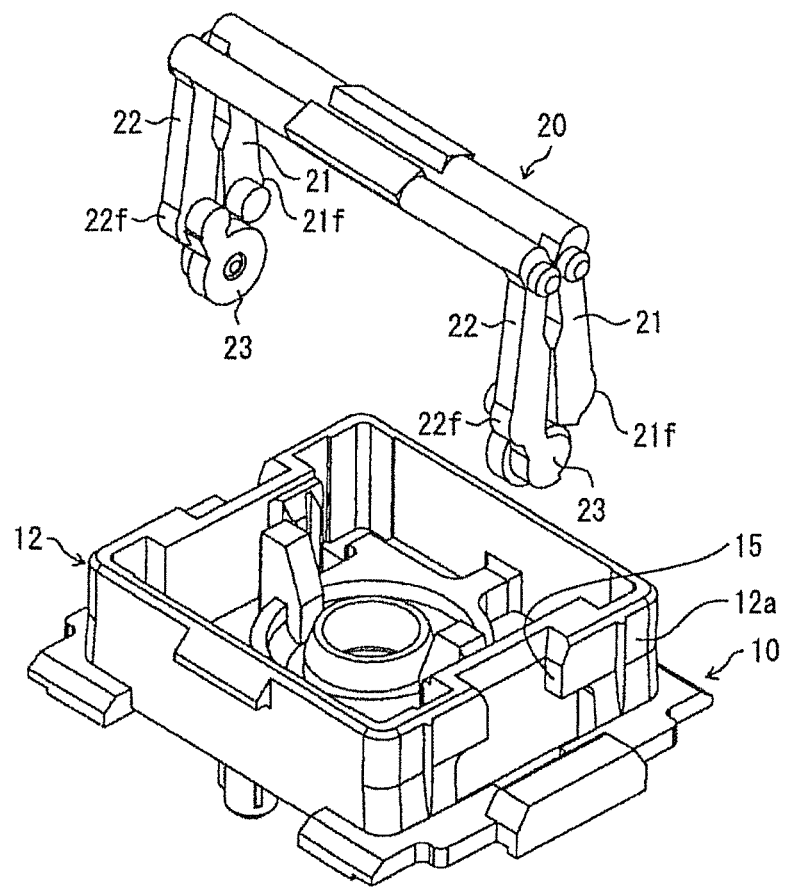
FIG. 6 is a perspective view illustrating a production method for the switch, the view illustrating a state in which a pair of link members has been bent so that the link members are attached to the base.

As illustrated in FIG. 3, in a center portion of the one opposed side wall 12a, a side wall recessed groove portion 15 is formed as a gap which is recessed inward. As illustrated in FIG. 6, a side wall recessed groove portion 15 forms a movement space 15b having a width such that a coupling portion 23 of the link member 20 and the closed first link member 21 and second link member 22 can freely move up and down. As a result, with the first link member 21 and the second link member 22 in an open state, the coupling portion 23 or a first curved projection 21g and a second curved projection 22g of a first arm 21b and a second arm 22b, described later, cannot pass through the side wall recessed groove portion 15. In addition, an overhanging portion (an example of a movement regulator) 15a is formed in the side wall recessed groove portion 15. With the first link member 21 and the second link member 22 in the open state, the overhanging portion 15a is brought into contact with the first curved projection 21g and the second curved projection 22g of the first arm 21b and the second arm 22b and slides, so as to have a function as a wall surface to regulate upward movement (i.e., the direction in which the operation unit 50 separates from the base 10) of the first arm 21b and the second arm 22b (i.e., a first curved portion 21f and a second curved portion 220.

A claw portion 16 is formed at the top center outside each of a pair of the other opposed side walls 12b in the square frame 12. The claw portion 16 is for preventing the operation unit 50 from being easily detached upward.

The bottom 11 is formed with an annular groove-like coil spring accommodating portion 11a that supports and accommodates the coil spring 40, and a terminal through hole 11b that allows passage of a terminal of the switch mechanism 30.

Next, the link member 20 is made up of a pair of the first link member 21 and the second link member 22, to support the base 10 and the operation unit 50 so that the operation unit 50 moves in a vertical direction.

The first link member 21 and the second link member 22 have the same shape and are coupled to each other by a coupling portion 23 mutually coupled at one end on the center side and combined in a V shape in a side view. In the embodiment, the coupling portion 23 is made up of a shaft portion 21a formed in the first link member 21 and a shaft hole portion 22a formed in the second link member 22, and pivotally supports and couples between the pair of link members 20 in a turnable manner. Note that a shaft portion may be formed in the second link member 22 and a shaft hole portion may be formed in the first link member 21.

The shaft portion 21a and the shaft hole portion 22a are pivotally supported and coupled in a turnable manner in a loosely fitted state, and a gap is constant in this loosely fitted portion.

Figure 4:
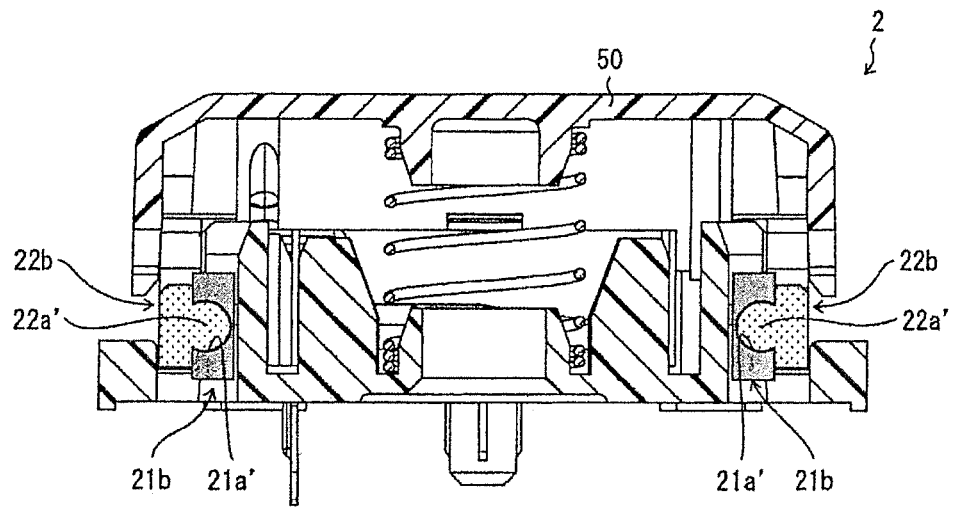
FIG. 4 is a sectional view illustrating a configuration of a modified example of the switch.

In the switch 1 of the embodiment, the coupling portion 23 is made up of the shaft portion formed in one of the first link member 21 and the second link member 22, and the shaft hole portion formed in the other of the first link member 21 and the second link member 22, but the shaft portion and the shaft hole portion are not necessarily restrictive. For example, as illustrated in FIG. 4, there may be provided a switch 2 made up of a sphere portion 22a' formed in one of the first link member 21 and the second link member 22, and a sphere acceptor 21a' that rotatably holds this spherical portion 22a'.

The first link member 21 and the second link member 22 integrally include the first arm 21b and the second arm 22b as a pair of connection members extending laterally in parallel to each other from the coupling portion 23, and a first latching rod 21c and a second latching rod 22c which couple between the first arm 21b and the second arm 22b at the ends on the opposite side from the coupling portion 23.

Figure 5:
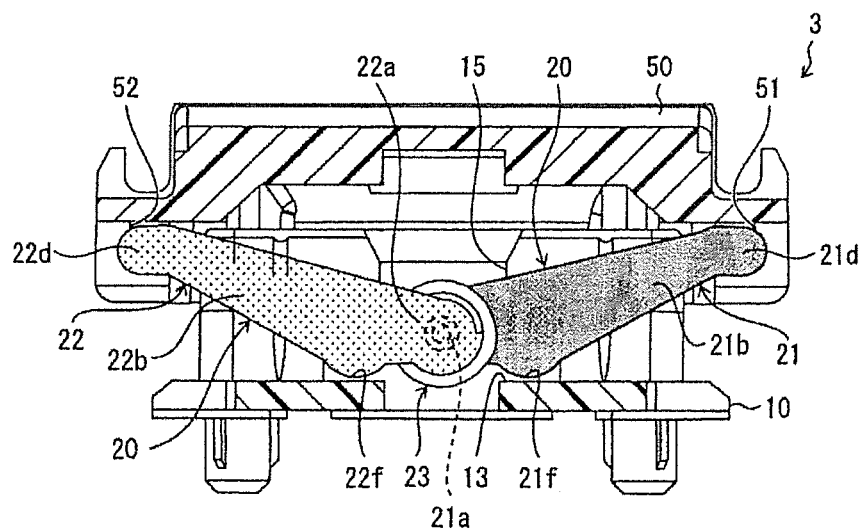
FIG. 5 is a sectional view illustrating a configuration of another modified example of the switch.

As illustrated in FIGS. 1(a) to 3, portions of the first arm 21b and the second arm 22b, which face the operation unit 50, are formed in a staircase shape, for example. However, this is not necessarily restrictive, and for example as illustrated in FIG. 5, there can be provided a switch 3 in which the portions of the first arm 21b and the second arm 22b, which face the operation unit 50, are formed linearly from the coupling portion 23 to a first rotary spindle 21d and a second rotary spindle 22d, and the first arm 21b and the second arm 22b are formed in a substantially triangular shape in cross section. In addition, the shapes of the first arm 21b and the second arm 22b are not limited to this, and may be a plate shape or a bar shape.

Both ends of the first latching rod 21c and the second latching rod 22c are respectively formed with the first rotary spindles 21d and the second rotary spindles 22d as end-side supported portions. The first rotary spindle 21d and the second rotary spindle 22d are to be accepted by a first bearing 51 and a second bearing 52, described later, provided in the operation unit 50.

In the embodiment, the first rotary spindle 21d and the second rotary spindle 22d are to be accepted in the loosely fitted state by the first bearing 51 and the second bearing 52 as sliding regulators. As a result, in the embodiment, in conjunction with the movement of the operation unit 50 in the vertical direction (contacting/separating direction) with respect to the base 10, the first rotary spindle 21d and the second rotary spindle 22d are slidable in a direction substantially perpendicular to the vertical direction (contacting/separating direction) and in a direction substantially perpendicular to the turning shaft of the link member 22. As illustrated in FIG. 2(a), a sliding range for the first rotary spindle 21d is regulated by inner surfaces 51a, 51b of a first bearing 51 disposed on each side of the first rotary spindle 21d in a direction substantially perpendicular to the contacting/separating direction and in a direction substantially perpendicular to the turning shaft of the link member 22. A sliding range for the second rotary spindle 22d is regulated by inner surfaces 52a, 52b of a second bearing 52 disposed on each side of the second rotary spindle 22d in a direction substantially perpendicular to the contacting/separating direction and in a direction substantially perpendicular to the turning shaft of the link member 22.

The respective centers of the first latching rod 21c and the second latching rod 22c are formed with an upper end flat surface portion 21e and an upper end flat surface portion 22e having flat upper surfaces so that the postures at the upper end positions of the operation unit 50 are held in parallel to the base 10.

Sections of the first arm 21b and the second arm 22b which are near the coupling portion 23 are formed with a first curved portion 21f and a second curved portion 22f as coupling-portion-side supported portions protruding downward in a curved shape. As a result, the first curved portion 21f and the second curved portion 22f are disposed as shifted to the base 10 side from straight lines connecting between the coupling portion 23 and the first rotary spindle 21d/the second rotary spindle 22d.

In the embodiment, upon turning of the first link member 21 and the second link member 22, the first curved portion 21f and the second curved portion 22f slide on the upper surface of the guard portion 13 of the base 10, and the first curved projection 21g and the second curved projection 22g slide on the lower surface of the overhanging portion 15a in the side wall recessed groove portion 15 of the base 10. As a result, when the operation unit 50 is depressed to a lower limit position and the first link member 21 and the second link member 22 come into the open state, the coupling portion 23 is lifted to a slightly higher position than the first curved portion 21f and the second curved portion 22f. This can reduce variation in interval between the first rotary spindle 21d of the first link member 21 and the second rotary spindle 22d of the second link member 22 when the operation unit 50 moves in the vertical direction with respect to the base 10.

Further, near the coupling portion 23 inside the first arm 21b and the second arm 22b of the present embodiment, as illustrated in FIG. 3, the upper surface thereof is in contact with the overhanging portion 15a of the sidewall concave groove 15A first curved projection 21g and a second curved projection 22g in a curved shape projecting so as to be in contact with each other are formed. The first curved projection 21g and the second curved projection 22g are formed such that when the first link member 21 and the second link member 22 are opened around the coupling portion 23, the upper surface of the first curved projection 21g and the second curved projection 22g And slides while abutting against the portion 15a. As a result, the first curved projection 21g and the second curved projection 22g are disposed as shifted downward from the straight lines connecting between the coupling portion 23 and the first rotary spindle 21d/the second rotary spindle 22d.

Next, the switch mechanism 30 is made up of two L-shaped conductive plates 31, 32 formed of a flexible metal provided so as to come into contact with each other when the operation unit 50 is depressed. On the L-shaped conductive plates 31, 32, lead terminals 31a, 32a for connecting to a substrate (not illustrated) are provided extending downward. On the respective side surfaces of the conductive plates 31, 32, contact terminals 31b, 32b are provided facing each other. The ends of the L-shaped conductive plates 31, 32 are formed with cam slid portions 31c, 32c which are each slid by a sliding cam, not illustrated, which is provided on the rear surface of the operation unit 50. When the operation unit 50 is not depressed, the sliding cam of the operation unit 50 comes into contact with the cam sliding portions 31c, 32c of the L-shaped conductive plates 31, 32 to press the cam slid portions 31c, 32c and bend the L-shaped conductive plates 31, 32, so that the contact terminals 31b, 32b of the L-shaped conductive plates 31, 32 are not in contact with each other. On the other hand, when the operation unit 50 is depressed, the sliding cam of the operation unit 50 does not come into contact with each of the cam sliding portions 31c, 32c of the L-shaped conductive plates 31, 32, so that the contact terminals 31b, 32b of the L-shaped conductive plates 31, 32 come into contact with each other. As a result, at the time of depressing the operation unit 50, the L-shaped conductive plate 31 and the L-shaped conductive plate 32 become conductive and the switch is turned on.

Note that the switch mechanism 30 of the embodiment is not limited to what has been described above, but may be any configuration having a function as a switch, such as a membrane switch or a contactless switch.

Next, the coil spring 40 applies an urging force to the depression of the operation unit 50 and restores the operation unit 50 into the original state prior to the depression. Note that the coil spring 40 may be another elastic member.

Next, the operation unit 50 is a dish-shaped member having a substantially rectangular planar shape and is provided with a pair of the first bearings 51 and a pair of the second bearings 52 that are rotatably latched to the first rotary spindle 21d and the second rotary spindle 22d of the first link member 21 and the second link member 22. As a result, the operation unit 50 is supported by the first link member 21 and the second link member 22 in a freely depressed manner.

In the switch 1 of the embodiment, the following case has been described. The pair of link members 20 includes the first curved portion 21f and the second curved portion 22f as the coupling-portion-side supported portions supported by the base 10, and the first rotary spindle 21d and the second rotary spindle 22d as the end-side supported portion supported by the operation unit 50. When the operation unit 50 moves in the vertical direction with respect to the base 10, the first curved portion 21f, the second curved portion 22f, the first curved projection 21g, and the second curved projection 22g slide in the direction substantially perpendicular to the vertical direction with respect to the base 10.

However, the present invention is not necessarily limited thereto, and the following configuration may be formed. The pair of link members 20 includes the coupling-portion-side supported portion supported by the operation unit 50 and the end-side supported portion supported by the base. When the operation unit 50 moves in the vertical direction with respect to the base 10, the coupling-portion-side supported portion slides in the direction substantially perpendicular to the vertical direction with respect to the operation unit.

(Operation of Switch)

Figure 1A:
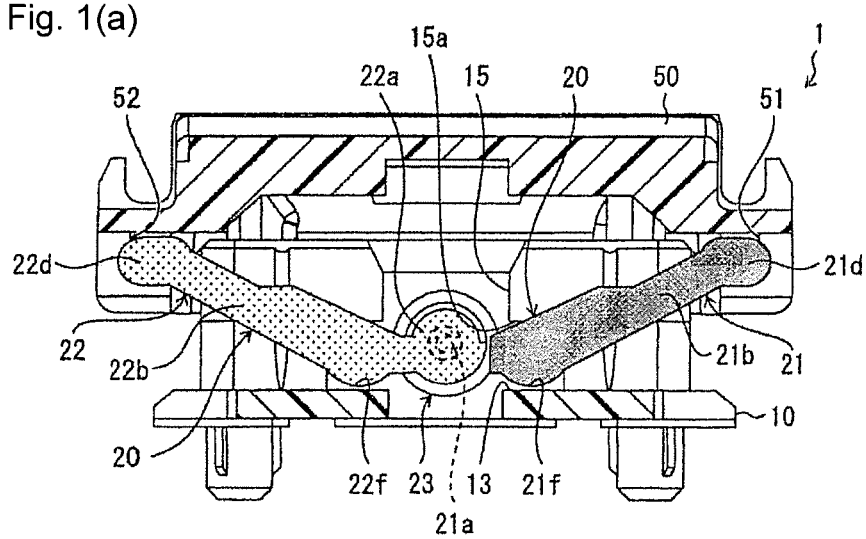
FIG. 1(a) is a sectional view illustrating one embodiment of a switch in the present invention, the view illustrating a state of the switch when an operation unit is not depressed.
Figure 1B:
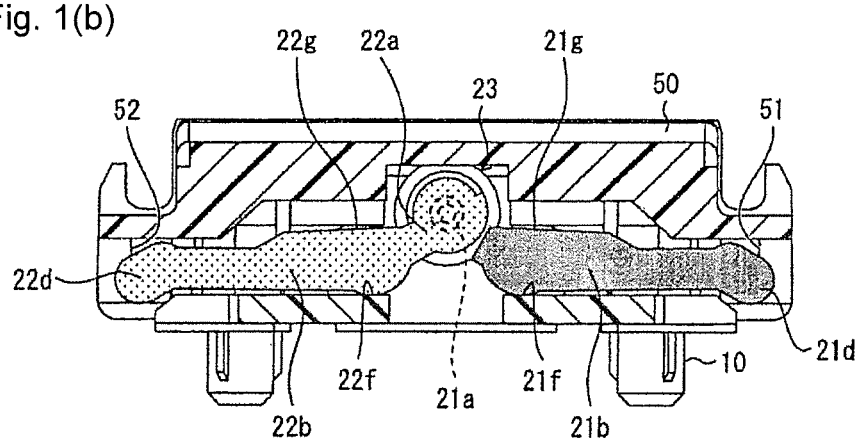
FIG. 1(b) is a sectional view illustrating a state of the switch when the operation unit is depressed.

The operation of the switch 1 having the above configuration when the operation unit 50 is not depressed and when the operation unit 50 is depressed will be described with reference to FIGS. 1(a), 1(b) and FIGS. 2(a), 2(b). FIG. 1(a) is a sectional view illustrating a state of the switch 1 when the operation unit 50 is not depressed, namely, a state in which the operation unit 50 is present at an upper limit position. FIG. 1(b) is a sectional view illustrating a state of the switch 1 when the operation unit 50 is depressed, namely, a state in which the operation unit 50 is present at the lower limit position.

As illustrated in FIGS. 1(a) and 2(a), when the operation unit 50 of the switch 1 is not depressed, namely, before depressed, the operation unit 50 is present at the upper limit position. At this time, the first link member 21 and the second link member 22 are supported by the coupling portion 23 pivotally supporting one ends of the first arm 21b and the second arm 22b in a turnable manner and by the first bearing 51 and the second bearing 52 of the operation unit 50 accepting the other ends of the first rotary spindle 21d and the second rotary spindle 22d.

When a user depresses the operation unit 50 with a finger or the like from the above state, the first bearing 51 and the second bearing 52 of the operation unit 50 are depressed so that the first link member 21 and the second link member 22 are turned around the coupling portion 23 while sliding in contact portions between the first curved portion 21f/the second curved portion 22f and the guard portion 13 of the base 10 and in contact portions between the first curved projection 21g/the second curved projection 22g and the overhanging portion 15a of the side wall recessed groove portion 15. At this time, the first rotary spindle 21d and the second rotary spindle 22d in the first arm 21b and the second arm 22b of the first link member 21 and the second link member 22 move in the perpendicular direction while making small movement outward. As a result, the first link member 21 and the second link member 22 lift the coupling portion 23 when sliding in the contact portions between the first curved portion 21f/the second curved portion 22f and the guard portion 13 of the base 10 and in the contact portions between the first curved projection 21g/the second curved projection 22g and the overhanging portion 15a of the side wall recessed groove portion 15.

Therefore, as illustrated in FIG. 1(b) and FIG. 2(b), even when the operation unit 50 moves to the lower limit position which is the end in the direction approaching the base 10, the operation unit 50 can move while the lengths of the first arm 21b and the second arm 22b cause no problem. By the downward movement of the operation unit 50, the L-shaped conductive plate 31 of the switch mechanism 30 is bent by the sliding cam (not illustrated) formed on the rear surface of the operation unit 50, and the contact terminal 31b of the L-shaped conductive plate 31 comes into contact with the contact terminal 32b of the L-shaped conductive plate 32. As a result, the L-shaped conductive plate 31 and the L-shaped conductive plate 32 become conductive, and the switch is turned on.

When the user releases the press of the finger to the operation unit 50 from the state of depressing the operation unit 50, the operation unit 50 is restored to the original upper limit position by the urging force of the coil spring 40.

As a result, in the switch 1 of the embodiment, in the depressing operation of the operation unit 50, only the first rotary spindle 21d and the second rotary spindle 22d are latched to the first bearing 51 and the second bearing 52, so that the clearance is constant, and there is little risk of biting of a foreign matter.

In addition, by the depression of the operation unit 50, the sliding position moves mainly in the first curved portion 21*f* and the second curved portion 22*f* of the first link member 21 and the second link member 22 and the guard portion 13, so that the outer edges of the first link member 21 and the second link member 22 hardly spread outward.

(How to Assemble Switch)

Next, a production method for the switch 1 of the embodiment will be described with reference to FIGS. 6 to 10(*a*), 10(*b*), and 10(*c*). FIGS. 6 to 10(*a*), 10(*b*), and 10(*c*) are views illustrating the production method for the switch 1 of the embodiment.

Figure 7A:
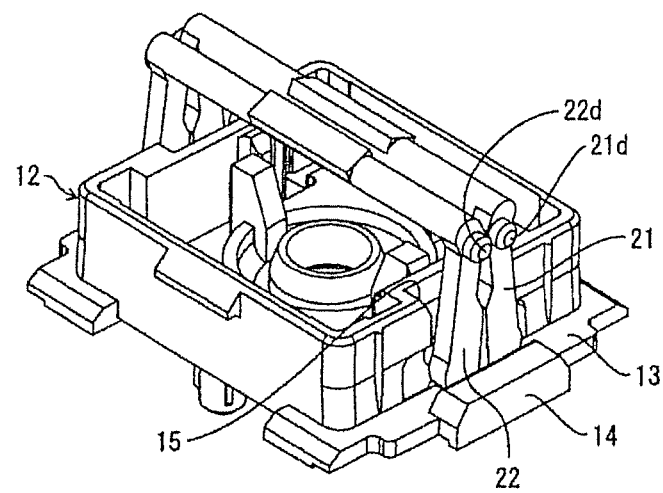
FIG. 7(a) is a perspective view illustrating the production method for the switch, the view illustrating a state in which the pair of link members has been inserted into a side wall recessed groove portion of the base so that the link members are attached to the base.
Figure 7B:
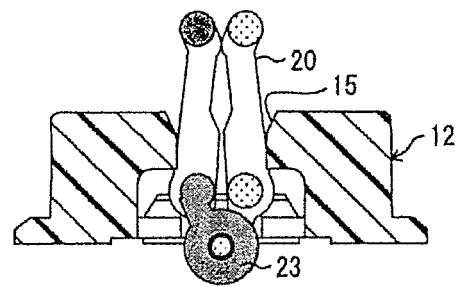
FIG. 7(b) is a sectional view thereof.

As illustrated in FIG. 6, at the time of producing the switch 1 of the embodiment, first, the first link member 21 and the second link member 22 pivotally supported in a turnable manner by the coupling portion 23 are folded with the coupling portion 23 at the center. Subsequently, as illustrated in FIGS. 7(*a*) and 7(*b*), the folded link member 20 is inserted into the movement space 15*b* of the side wall recessed groove portion 15 on the one opposing side wall 12*a* of the base 10.

Figure 8A:
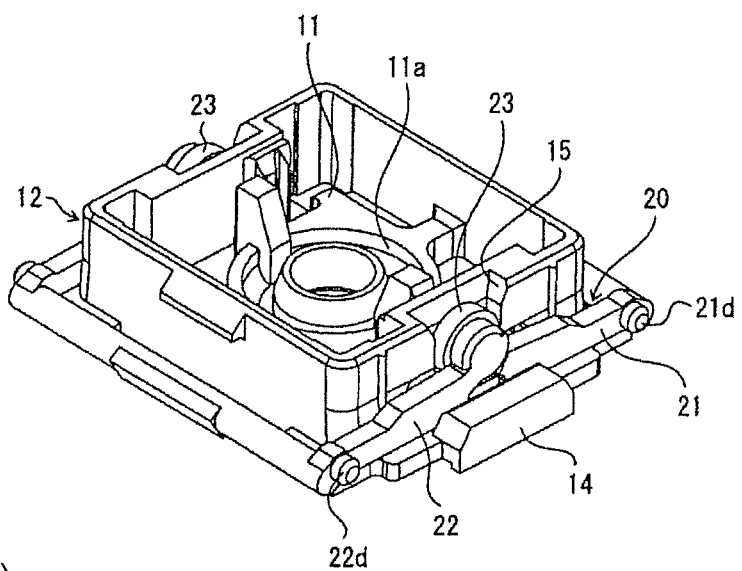
FIG. 8(a) is a perspective view illustrating the production method for the switch, the view illustrating a state in which a first link member and a second link member of the link members inserted into the side wall recessed groove portions of the base have been spread.
Figure 8B:
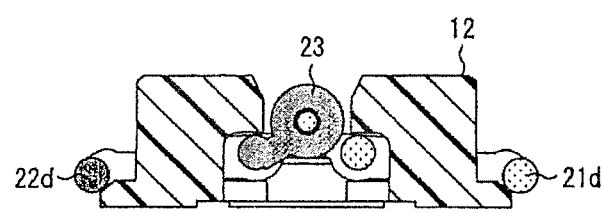
FIG. 8(b) is a sectional view thereof.

Next, as illustrated in FIGS. 8(*a*) and 8(*b*), after the insertion into the movement space 15*b* of the side wall recessed groove portion 15 of the base 10 and passage through the movement space 15*b*, the first link member 21 and the second link member 22 of the link members 20 are turned around the coupling portion 23 and spread so as to be arranged linearly.

Even when left in this state, the first link member 21 and the second link member 22 are not turned around the coupling portion 23 or not folded, but are kept arranged linearly. Therefore, in this state, the coil spring 40 is accommodated in the coil spring accommodating portion 11*a* into the bottom 11 of the base 10, and the switch mechanism 30 is accommodated into the bottom 11.

Figure 9A:
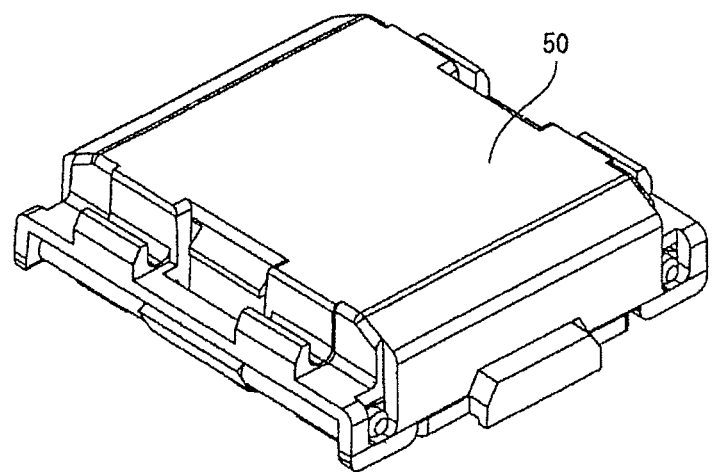
FIG. 9(a) is a perspective view illustrating the production method for the switch, the view illustrating a state in which the operation unit has been placed on and attached to the base where the spread link member has been attached.
Figure 9B:
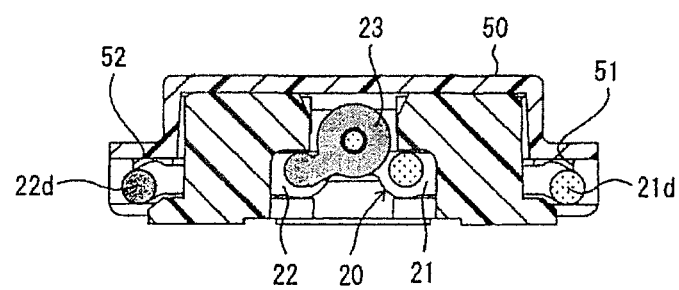
FIG. 9(b) is a sectional view thereof.

Next, as illustrated in FIGS. 9(*a*) and 9(*b*), the operation unit 50 is placed on and attached to the base 10 where the spread link members 20, the coil spring 40, and the switch mechanism 30 are attached. At this time, the first rotary spindle 21*d* and the second rotary spindle 22*d* of the link member 20 are inserted into the first bearing 51 and the second bearing 52 of the operation unit 50. Since the link member 20 has some elasticity, the first rotary spindle 21*d* and the second rotary spindle 22*d* of the link member 20 can be easily inserted and latched to the first bearing 51 and the second bearing 52 of the operation unit 50.

Figure 10A:
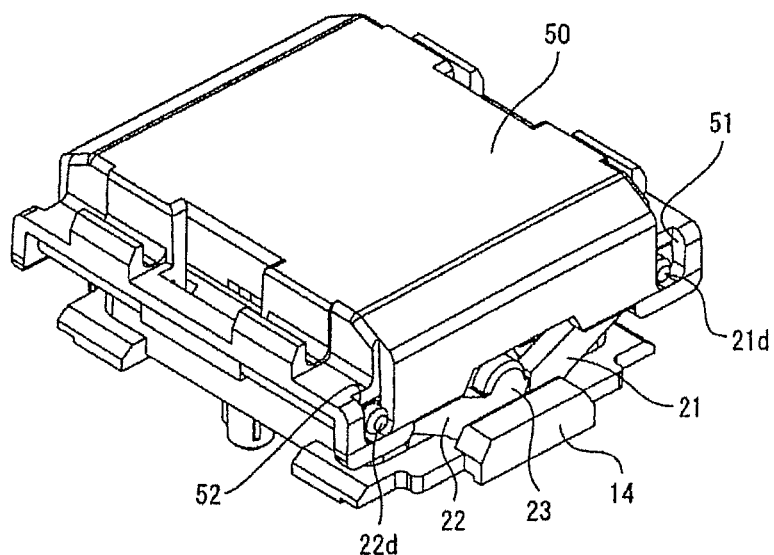
FIG. 10(a) is a perspective view illustrating the production method for the switch, the view illustrating a state in which the operation unit attached to the base has moved to an upper limit position by a coil spring.
Figure 10B:
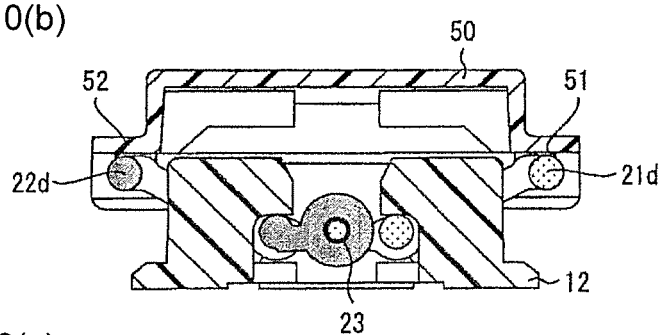
FIG. 10(b) is a sectional view thereof.
Figure 10C:
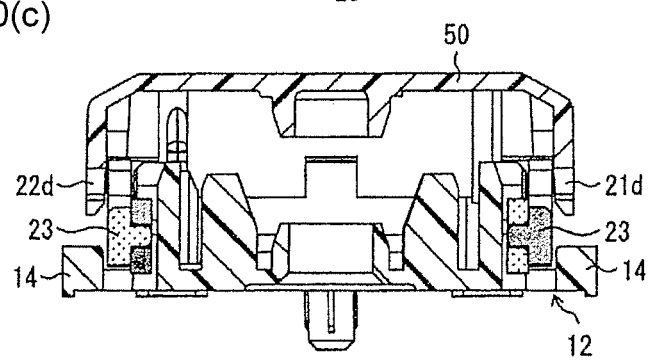
FIG. 10(c) is a sectional view in a direction orthogonal to FIG. 10(b).
Figure 11A:
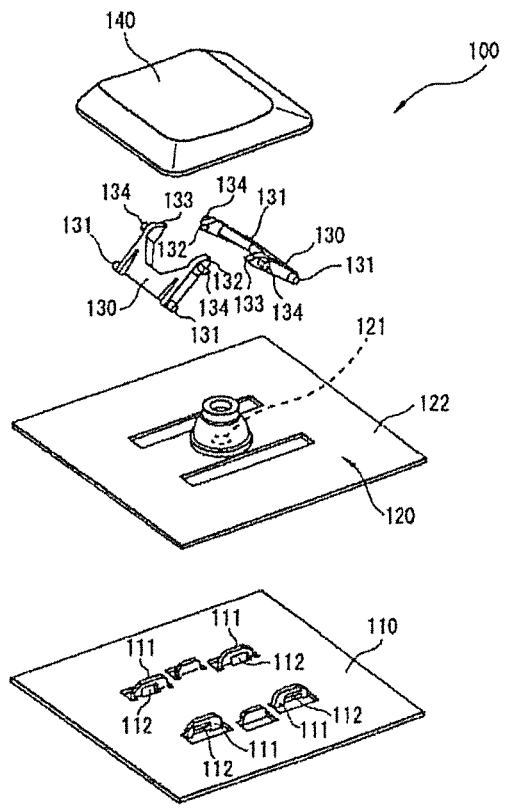
FIG. 11(a) is an exploded perspective view illustrating a configuration of a conventional key switch device.
Figure 11B:
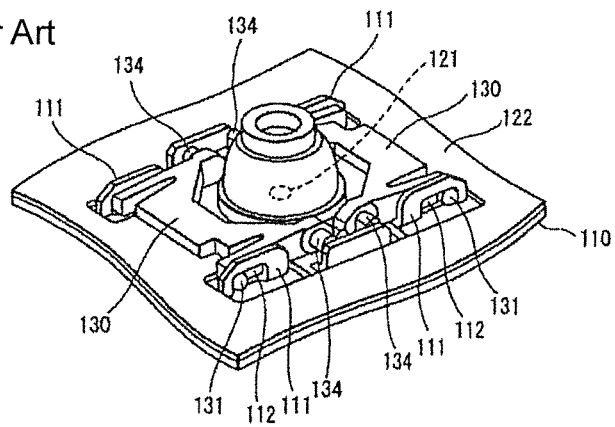
FIG. 11(b) is a perspective view illustrating a configuration of the key switch device with the operation unit removed therefrom.

Then, as illustrated in FIGS. 10(*a*), 10(*b*), and 10(*c*), by the urging force of the coil spring 40, the operation unit 50 attached to the base 10 moves to the upper limit position which is the end of the operation unit 50 in the direction separating from the base 10. At this time, the dish-shaped operation unit 50 regulates the movement of the link member 20, so that the link member 20 can turnably move within the internal space of the operation unit 50. Although there is the possibility that the link member 20 is pushed outward due to being formed of an elastic member, in the embodiment, the link member 20 is not pushed out laterally because the extrusion preventing wall 14 is provided on the base 10 as illustrated in FIGS. 10(*a*) and 10(*c*).

Through the above steps, the switch 1 of the embodiment can be produced.

As described above, the switch 1 of the embodiment includes: the base 10; the operation unit 50 disposed above the base 10 and moving in the vertical direction in response to the external force; the pair of link members 20 configured to guide the movement of the operation unit 50 in the vertical direction; and the coupling portion 23 configured to pivotally support and couple the pair of link members 20 to each other in a turnable manner. The pair of link members 20 each includes the first curved portion 21*f* and the second curved portion 22*f* as the coupling-portion-side supported portions supported on one of the base 10 and the operation unit 50 and the first rotary spindle 21*d* and the second rotary spindle 22*d* as the end-side supported portions supported on the other of the base 10 and the operation unit 50. One of the base 10 and the operation unit 50 on which the first curved portion 21*f* and the second curved portion 22*f* are supported includes the side wall recessed groove portion 15 as the wall surface provided with a gap through which the pair of link members 20, turned around the coupling portion 23 to be folded, is allowed to pass in the state of being supported on neither the base 10 nor the operation unit 50.

With the above configuration, the pair of link members 20 couples the base 10 and the operation unit 50 to each other. In addition, the coupling portion 23 pivotably couples the pair of link members 20 to each other in a turnable manner. With these configurations, it is possible to form a structure in which, when the operation unit 50 moves in the vertical direction with respect to the base 10, whichever part of the operation unit 50 is pressed, the operation unit 50 can be held in the state of being oriented in a fixed direction with respect to the base 10, such as being in parallel to the base 10.

In this structure, in the embodiment, through the gap of the side wall recessed groove portion 15 provided on the base 10 or the operation unit 50 on which the first curved portion 21*f* and the second curved portion 22*f* are supported, the pair of link members 20, turned around the coupling portion 23 to be folded, is allowed to pass in the state of being supported on neither the base 10 nor the operation unit 50.

As a result, the pair of link members 20 is turned around the coupling portion to be folded, and the first curved portion 21*f* and the second curved portion 22*f* are allowed to pass through the gap of the side wall recessed groove portion 15, and thereafter, the pair of link members 20 is turned around the coupling portion 23 to be opened so that the first curved portion 21*f* and second curved portion 22*f* can be in the state of being supported on the base 10 or the operation unit 50. That is, it is possible to eliminate the need for the structure that causes elastic deformation at the time of assembly, such as the snap fit structure, in the link member 20, the base 10, or the operation unit 50.

Hence it is possible to eliminate the need for the structure for allowing elastic deformation (slit structure, etc.), and eliminate the risk of damage on the member caused by elastic deformation.

It is thus possible to provide the switch 1 capable of maintaining smooth operation by assembling the switch 1 so as to be able to support the link member without using the snap fit.

Further, in the switch 1 of the embodiment, in a state where the pair of link members 20 is supported on the base 10 and the operation unit 50, the first curved portion 21*f* or the second curved portion 22*f* as the coupling-portion-side supported portion is not allowed to pass through the gap of the side wall recessed groove portion 15 as the wall surface.

Thus, after the assembly, the first curved portion 21*f* and the second curved portion 22*f* can be reliably prevented from falling off the base 10 or the operation unit 50 on which the first curved portion 21f and the second curved portion 22f are supported.

Further, in the switch 1 of the present embodiment, when the operating portion 50 moves in the vertical direction with respect to the base 10, the first rotary spindle 21d and the second rotary spindle 22d as the end-side supported portions slide in the direction substantially perpendicular to the vertical direction with respect to the supported base 10 or the operation portion 50 on which the first rotary spindle 21d and the second rotary spindle 22d are supported, and the base 10 or the operation unit 50 supporting the first rotary spindle 21d and the second rotary spindle 22d is provided with the first bearing 51 and the second bearing 52 as the sliding regulators that regulate the sliding range.

Hence the first bearing 51 and the second bearing 52 regulate the sliding ranges for the first rotary spindle 21d and the second rotary spindle 22d in the direction substantially perpendicular to the vertical direction. As a result, after the first rotary spindle 21d and the second rotary spindle 22d are assembled so as to be supported on one of the base 10 and the operation unit 50, the range of the turning of the pair of link members 20 around the coupling portion 23 is limited, so that it is possible to reliably prevent the first curved portion 21f and second curved portion 22f from passing through the gap.

Further, in the switch 1 of the embodiment, the pair of link members 20 each includes the first arm 21b and the second arm 22b as the plate-shaped or bar-shaped connection member configured to connect the first curved portion 21f and the second curved portion 22f as the coupling-portion-side supported portions, the first rotary spindle 21d and the second rotary spindle 22d as the end-side supported portions, and the coupling portion 23. The base 10 or the operation unit 50 supporting the first curved portion 21f and the second curved portion 22f is provided with the extrusion preventing wall 14 as the deformation preventing portion that prevents lateral elastic deformation of the first arm 21b and the second arm 22b.

Thus, since the first curved portion 21f and the second curved portion 22f supported on the base 10 or the operation unit 50 are provided on the plate-shaped or bar-shaped first arm 21b and second arm 22b, for example, when a large external force is applied to the first arm 21b and the second arm 22b through the first curved portion 21f and the second curved portion 22f, there is a risk the first arm 21b and the second arm 22b are elastically deformed, and the coupling-portion-side supported portions are pushed laterally to come off the base or operation unit on which the coupling-portion-side supported portions are supported.

In contrast, in the embodiment, the extrusion preventing wall 14 can prevent the first arm 21b and the second arm 22b from being elastically deformed and prevent the first arm 21b and the second arm 22b from being pushed out laterally, thereby eliminating the above risk.

Further, the keyboard of the embodiment is provided with a plurality of switches 1. It is thus possible to provide the keyboard including the switch 1 capable of maintaining smooth operation by assembling the switch 1 so as to be able to support the link member 20 without using the snap fit.

Further, the production method for the switch 1 of the embodiment includes: turning the pair of link members 20 around the coupling portion 23 to be folded and allowing the first curved portion 21f and the second curved portion 22f as the coupling-portion-side supported portions to pass through the gap of the side wall recessed groove portion 15; turning the pair of link members 20 around the coupling portion 23 to be spread and disposing the first curved portion 21f and the second curved portion 22f as the coupling-portion-side supported portions in the space between the overhanging portion 15a as the wall surface and the base 10 or the operation unit 50; and performing assembly so as to be able to support the first rotary spindle 21d and the second rotary spindle 22d as the end-side supported portions on the operation unit 50 or the base 10.

Thus, in the case of producing the switch 1, at the time of assembly for supporting the first arm 21b and the second arm 22b on the base 10 or the operation unit 50, it is only necessary that the pair of link members 20 be turned around the coupling portion 23 to be folded and the first curved portion 21f and second curved portion 22f be moved and allowed to pass through the gap of the side wall recessed groove portion 15, and thereafter, the pair of link members 20 be turned around the coupling portion 23 to be spread.

As a result, it is possible to eliminate the need for the step of causing elastic deformation of the link member 20, the base 10, or the operation unit 50 at the time of assembling the switch 1. Hence it is possible to eliminate the need for the structure to allow elastic deformation (slit structure, etc.) in the switch 1, and eliminate the risk of damage on the member caused by elastic deformation.

It is thus possible to provide the production method for the switch 1 capable of maintaining smooth operation by assembling the switch 1 so as to be able to support the link member without using the snap fit.

A variety of embodiments of the present invention have been described in detail with reference to the drawings, and lastly, a variety of aspects of the present invention will be described.

A switch of a first aspect of the present invention includes: a base; an operation unit disposed above the base and moving in a vertical direction with respect to the base in response to an external force; a pair of link members configured to guide movement of the operation unit in the vertical direction; and a coupling portion configured to pivotally support and couple the pair of link members to each other in a turnable manner, the pair of link members each including a coupling-portion-side supported portion supported on one of the base and the operation unit and an end-side supported portion supported on the other of the base and the operation unit. One of the base and the operation unit on which the coupling-portion-side supported portion is supported includes a wall surface provided with a gap through which the pair of link members, turned around the coupling portion to be folded, is allowed to pass in the state of being supported on neither the base nor the operation unit.

In other words, a switch of the first aspect of the present invention includes: a base; an operation unit disposed above the base and moving in a contacting/separating direction with respect to the base in response to an external force; a pair of link members configured to guide movement of the operation unit in the contacting/separating direction; and a coupling portion configured to turnably couple the pair of link members to each other, the pair of link members each including a coupling-portion-side supported portion supported on one of the base and the operation unit and an end-side supported portion supported on the other of the base and the operation unit. One of the base and the operation unit on which the coupling-portion-side supported portion is supported includes a wall surface provided with a movement space through which the pair of link members, turned around the coupling portion to be folded, is allowed to pass while movement is regulated by neither the base nor the operation unit.

According to the switch of the first aspect of the present invention, the pair of link members couples the base and the operation unit to each other. In addition, the coupling portion turnably couples the pair of link members to each other. With these configurations, when the operation unit is moved in the contact/separation direction with respect to the base, even if any portion of the operation unit is pressed, the operation unit is oriented in a certain direction, for example, parallel to the base It is possible to realize a structure capable of maintaining the state in which it is present.

In this structure, in the present invention, the gap provided on the wall provided on the base or the operation unit on which the coupling-portion-side supported portion is supported forms the movement space through which the pair of link members, turned around the coupling portion to be folded, is allowed to pass while movement is regulated by neither the base nor the operation unit.

As a result, the pair of link members is turned around the coupling portion to be folded, the two coupling-portion-side supported portions are allowed to pass through the movement space provided on the wall surface, and thereafter, the pair of link members is turned around the coupling portion to be opened so that the two coupling-portion-side supported portions can be in the state of being supported on the base or the operation unit. That is, it is possible to eliminate the need for the structure that causes elastic deformation at the time of assembly, such as the snap fit structure, in the link member, the base, or the operation unit.

Hence it is possible to eliminate the need for the structure for allowing elastic deformation (slit structure, etc.), and eliminate the risk of damage on the member caused by elastic deformation.

It is thus possible to provide the switch capable of maintaining smooth operation by assembling the switch so as to be able to support the link member without using the snap fit.

In a switch of a second aspect of the present invention, in the switch described above, in a state where the pair of link members is supported on the base and the operation unit, the coupling-portion-side supported portion is not allowed to pass through the gap of the wall surface.

In other words, in the switch of the second aspect of the present invention, the wall surface includes a movement regulator configured to regulate movement of the coupling-portion-side supported portion in the separating direction in which the operation unit separates from the base in a state where the pair of link members that passes through the movement space is turned around the coupling portion to be opened.

According to the switch of the second aspect of the present invention, after the assembly, the coupling-portion-side supported portion can be reliably prevented from falling off the base or the operation unit on which the coupling-portion-side supported portion is supported.

In a switch of a third aspect of the present invention, in the switch described above, when the operation unit moves in the vertical direction with respect to the base, the end-side supported portion slides in a direction substantially perpendicular to the vertical direction with respect to the base or the operation unit on which the end-side supported portion is supported, and the base or the operation unit supporting the end-side supported portion includes a sliding regulator configured to regulate a range of the sliding.

In other words, in the switch of the third aspect of the present invention, when the operation unit moves in the contacting/separating direction with respect to the base, the end-side supported portion slides in a direction substantially perpendicular to the contacting/separating direction with respect to the base or the operation unit on which the end-side supported portion is supported, and the base or the operation unit supporting the end-side supported portion includes a sliding regulator disposed on each side of the end-side supported portion in a direction substantially perpendicular to the contacting/separating direction and configured to regulate a range of the sliding.

According to the switch of the third aspect, the range of sliding in the direction substantially perpendicular to the vertical direction of the end-side supported portion is regulated by the sliding regulator. As a result, after the end-side supported portion is assembled so as to be supported on one of the base and the operation unit, the range of the turning of the pair of link members around the coupling portion is limited, so that it is possible to reliably prevent the two coupling-portion-side supported portions from passing through the gap.

In a switch of a fourth aspect of the present invention, in the switch described above, the pair of link members each includes a plate-shaped or bar-shaped connection member configured to connect the coupling-portion-side supported portion, the end-side supported portion, and the coupling portion, and the base or the operation unit supporting the coupling-portion-side supported portion is provided with a deformation preventing portion configured to prevent lateral elastic deformation of the connection member.

In other words, in the switch of the fourth aspect of the present invention, the pair of link members each includes a plate-shaped or bar-shaped connection member configured to connect the coupling-portion-side supported portion, the end-side supported portion, and the coupling portion, and the base or the operation unit supporting the coupling-portion-side supported portion is provided with a deformation preventing portion disposed in a direction of a turning shaft of the pair of link members and configured to prevent elastic deformation of the connection member in a direction to the turning shaft.

In a case where the coupling-portion-side supported portion is provided on the plate-shaped or bar-shaped connection member, when a large external force is applied to the connection member through the coupling-portion-side supported portion, the connection member is elastically deformed, and the coupling-portion-side supported portion is pushed laterally to come off the base or operation unit on which the coupling-portion-side supported portion is supported.

In contrast, according to the switch of the fourth aspect, the deformation preventing portion can prevent the connection member from being elastically deformed and prevent the connection member from being pushed out laterally, thereby eliminating the above risk.

A keyboard of a fifth aspect of the present invention includes a plurality of the switches described above.

According to the keyboard of the fifth aspect, it is possible to provide a keyboard including the switch of the above aspect which can maintain smooth operation.

A production method of a sixth aspect of the present invention is a production method for a switch including a base, an operation unit disposed above the base and moving in a vertical direction in response to an external force, a pair of link members configured to guide movement of the operation unit in the vertical direction, and a coupling portion configured to pivotably support and couple the pair of link members to each other in a turnable manner, the pair of link members each including a coupling-portion-side supported portion supported on one of the base and the operation unit and an end-side supported portion supported on the other of the base and the operation unit, one of the base and the operation unit, on which the coupling-portion-side supported portion is supported, including a wall surface provided with a gap through which the pair of link members, turned around the coupling portion to be folded, is allowed to pass in the state of being supported by neither the base nor the operation unit. The production method includes: turning the pair of link members around a coupling portion to be folded and allowing the coupling-portion-side supported portion to pass through the gap on the wall surface; turning the pair of link members around the coupling portion to be spread and disposing the coupling-portion-side supported portion between the wall surface and the base or the operation unit; and performing assembly so as to be able to support the end-side supported portion on the operation unit or the base.

In other words, the production method of the sixth aspect of the present invention is a production method for a switch including a base, an operation unit disposed above the base and moving in a contacting/separating direction with respect to the base in response to an external force, a pair of link members configured to guide movement of the operation unit in the contacting/separating direction, and a coupling portion configured to turnably couple the pair of link members to each other, the pair of link members each including a coupling-portion-side supported portion supported on one of the base and the operation unit and an end-side supported portion supported on the other of the base and the operation unit, one of the base and the operation unit, on which the coupling-portion-side supported portion is supported, including a wall surface provided with a movement space through which the pair of link members, turned around the coupling portion to be folded, is allowed to pass while movement is regulated by neither the base nor the operation unit. The production method includes: turning the pair of link members around a coupling portion to be folded and allowing the coupling-portion-side supported portion to pass through the movement space on the wall surface; turning the pair of link members around the coupling portion to be spread and disposing the coupling-portion-side supported portion between the wall surface and the base or the operation unit; and performing assembly so as to be able to support the end-side supported portion on the operation unit or the base According to the production method of the sixth aspect, at the time of assembly for supporting the coupling-portion-side supported portion on the base or the operation unit, it is only necessary that the pair of link members be turned around the coupling portion to be folded and the two coupling-portion-side supported portions be moved and allowed to pass through the gap, and thereafter, the pair of link members be turned around the coupling portion to be spread.

As a result, it is possible to eliminate the need for the step of causing elastic deformation of the link member, the base, or the operation unit at the time of assembling the switch. Hence it is possible to eliminate the need for the structure to allow elastic deformation (slit structure, etc.) in the switch, and eliminate the risk of damage on the member caused by elastic deformation.

It is thus possible to provide the production method for the switch capable of maintaining smooth operation by assembling the switch so as to be able to support the link member without using the snap fit.

By appropriately combining freely selected embodiments or modified examples of the above variety of embodiments or modified examples, the respective effects of those combined can be exerted. While it is possible to combine embodiments, combine examples, or combine an embodiment and an example, it is also possible to combine features in different embodiments or examples.

INDUSTRIAL APPLICABILITY

The switch according to one or more embodiments of the present invention is applicable to, for example, a keyboard for a personal computer.

The keyboard according to one or more embodiments of the present invention is usable as, for example, a keyboard for a personal computer.

Further, the production method according to one or more embodiments of the present invention is applicable to production of a switch of a keyboard for a personal computer.

DESCRIPTION OF SYMBOLS 1-3 switch
10 base
11 bottom
12 square frame
12a one opposed side wall
12b the other opposed side wall
13 guard portion
14 extrusion preventing wall (example of deformation preventing portion)
15 side wall recessed groove portion (example of wall surface having movement space)
15a overhanging portion (example of movement regulator)
15b movement space
16 claw portion
20 link member
21 first link member
21a shaft portion (example of coupling portion)
21b first arm (example of connection member)
21c first latching rod
21d first rotary spindle (example of end-side supported portion)
21e upper end flat portion
21f first curved portion (example of coupling-portion-side supported portion)
21g first curved projection
22 second link member
22a shaft hole portion (example of coupling portion)
22b second arm (example of connection member)
22c second latching rod
22d second rotary spindle (example of end-side supported portion)
22e upper end flat portion
22f second curved portion (example of coupling-portion-side supported portion)
22g second curved projection
23 coupling portion
30 switch mechanism
31, 32 L-shaped conductive plate
31a, 32a lead terminal
31b, 32b contact terminal 31c, 32c cam slid portion
40 coil spring
50 operation unit
51 first bearing (example of sliding regulator)
52 second bearing (example of sliding regulator)

The invention claimed is:

1. A switch comprising:
a base comprising a first wall surface and a second wall surface;
an operation unit disposed above the base and moving in a contacting-separating direction with respect to the base in response to an external force;
a pair of link members removably coupled to the operation unit and configured to guide movement of the operation unit in the contacting-separating direction; and
a coupling portion configured to turnably couple the pair of link members,
wherein each of the pair of link members each includes a coupling-portion-side supported portion supported on one of the base and the operation unit and an end-side supported portion supported on the other of the base and the operation unit,
wherein the first wall surface and the second wall surface provide a movement space through which the coupling portion and the coupling-portion-side supported portion of the pair of link members, turned around the coupling portion to be folded, is allowed to pass, and
wherein in a state where the pair of link members is supported on the base and the operation unit, the coupling-portion-side supported portion is not allowed to pass
through a gap formed between the first wall surface and the second wall surface above the movement space.

2. A keyboard comprising a plurality of the switches according to claim 1.

3. The switch according to claim 1,
wherein each of the pair of link members includes a plate-shaped or bar-shaped connection member configured to connect the coupling-portion-side supported portion, the end-side supported portion, and the coupling portion, and
wherein the base or the operation unit supporting the coupling-portion-side supported portion is provided with a deformation preventing portion disposed in a direction of a turning shaft of the pair of link members and configured to prevent elastic deformation of the connection member in a direction to the turning shaft.

4. A keyboard comprising a plurality of the switches according to claim 3.

5. The switch according to claim 1,
wherein, when the operation unit moves in the contacting-separating direction with respect to the base, the end-side supported portion slides in a direction substantially perpendicular to the contacting-separating direction with respect to the base or the operation unit on which the end-side supported portion is supported, and
wherein the base or the operation unit supporting the end-side supported portion includes a sliding regulator disposed on each side of the end-side supported portion in a direction substantially perpendicular to the contacting-separating direction and configured to regulate a range of the sliding.

6. The switch according to claim 5,
wherein each of the pair of link members includes a plate-shaped or bar-shaped connection member configured to connect the coupling-portion-side supported portion, the end-side supported portion, and the coupling portion, and
wherein the base or the operation unit supporting the coupling-portion-side supported portion is provided with a deformation preventing portion disposed in a direction of a turning shaft of the pair of link members and configured to prevent elastic deformation of the connection member in a direction to the turning shaft.

7. A keyboard comprising a plurality of the switches according to claim 5.

8. The switch according to claim 1,
wherein the movement space includes a movement regulator configured to regulate movement of the coupling-portion-side supported portion in the separating direction in which the operation unit separates from the base in a state where the pair of link members that passes through the movement space is turned around the coupling portion to be opened.

9. The switch according to claim 8,
wherein, when the operation unit moves in the contacting-separating direction with respect to the base, the end-side supported portion slides in a direction substantially perpendicular to the contacting-separating direction with respect to the base or the operation unit on which the end-side supported portion is supported, and
wherein the base or the operation unit supporting the end-side supported portion includes a sliding regulator disposed on each side of the end-side supported portion in a direction substantially perpendicular to the contacting-separating direction and configured to regulate a range of the sliding.

10. The switch according to claim 8,
wherein each of the pair of link members includes a plate-shaped or bar-shaped connection member configured to connect the coupling-portion-side supported portion, the end-side supported portion, and the coupling portion, and
wherein the base or the operation unit supporting the coupling-portion-side supported portion is provided with a deformation preventing portion disposed in a direction of a turning shaft of the pair of link members and configured to prevent elastic deformation of the connection member in a direction to the turning shaft.

11. A keyboard comprising a plurality of the switches according to claim 8.

12. A production method for a switch comprising:
a base comprising a first wall surface and a second wall surface,
an operation unit disposed above the base and moving in a contacting-separating direction with respect to the base in response to an external force,
a pair of link members removably coupled to the operation unit and configured to guide movement of the operation unit in the contacting-separating direction, and
a coupling portion configured to turnably couple the pair of link members,
wherein each of the pair of link members includes a coupling-portion-side supported portion supported on one of the base and the operation unit and an end-side supported portion supported on the other of the base and the operation unit,
wherein the first wall surface and the second wall surface provide a movement space through which the coupling portion and the coupling-portion-side supported portion of the pair of link members, turned around the coupling portion to be folded, is allowed to pass, and wherein in a state where the pair of link members is supported on the base and the operation unit, the coupling-portion-side supported portion is not allowed to pass through a gap formed between the first wall surface and the second wall surface above the movement space, the method comprising:

turning the pair of link members around the coupling portion to be folded and allowing the coupling-portion-side supported portion to pass through the movement space;

turning the pair of link members around the coupling portion to be spread and disposing the coupling-portion-side supported portion between the first and second wall surfaces and the base or the operation unit; and performing assembly so as to be able to support the end-side supported portion on the operation unit or the base.

* * * * *